ELECTRO-OPTICAL MODULATOR

Filed Dec. 1, 1965

INVENTOR.
JOSEPH F. STEPHANY

BY *Samuel R. Genca*
ATTORNEY 3,379,887
ELECTRO-OPTICAL MODULATOR
Joseph F. Stephany, Rochester, N.Y., assignor to General Dynamics Corporation, a corporation of Delaware
Filed Dec. 1, 1965, Ser. No. 510,798
3 Claims. (Cl. 250—199)

ABSTRACT OF THE DISCLOSURE

Described herein is a modulator for light beams, especially laser beams. The modulator includes a pair of crossed light polarizers, a bi-refringent plate disposed between the pair of polarizers and a transducer which is connected to the plate along one edge thereof for vibrating the plate in its thickness mode. Connected to the transducer is an oscillator which produces signals having a frequency equal to the resonant frequency of the plate for vibration in its thickness mode. The oscillations need only be modulated with relatively low power modulating signals in order to obtain good modulation of the light beam. Also described is a retroreflective optical communication system wherein the light polarizers are mounted at a transmission station and the plate is located at a transponder station which contains the retroreflector.

Figure 1:
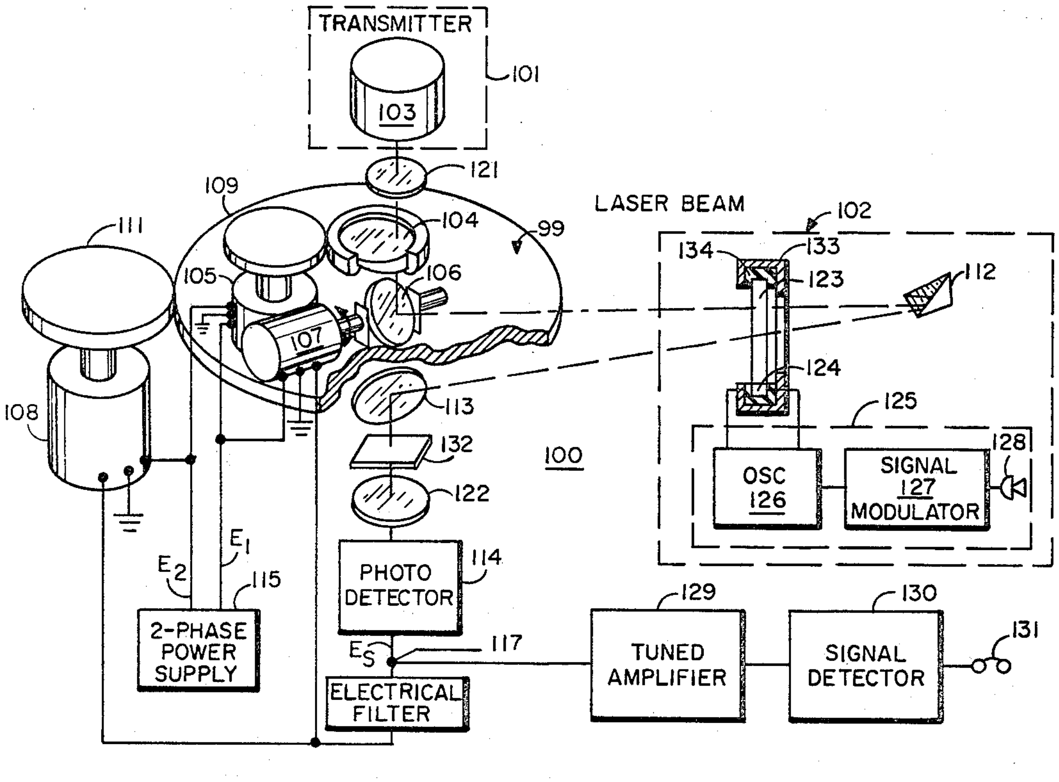

The present invention relates to an electro-optical apparatus and particularly to an optical signal modulator.

Although the present invention is suited for more general applications, such as the modulation of electromagnetic waves, it is particulraly adapted for use in a laser communication system in which a laser beam which originated at the transmitter is reflected, by a transponder, back to the transmitter so that two-way transfer of information may be accomplished by the same laser beam.

In order to modulate the laser beam at the transponder, it has been proposed to use a corner cube retroreflector having three mutually perpendicular reflecting surfaces. One of the reflecting surfaces is plated on an elastic member which is vibrated at various frequencies and amplitudes. The other two reflecting surfaces are plated on rigid members and fixed in their perpendicular relationship. By vibrating the resilient member, the reflected laser beam is deflected from its path in a vibratory manner. A photodetector on which the reflected beam is incident is disposed at the transmitter. The signal derived by the photodetector is effectively modulated by virtue of the deflection of the beam. The deflection of the laser beam is accompanied by distortion of the perpendicular relationship of the three reflecting surfaces. This distortion, however, changes the perpendicular relationship of the three mirrors and increases the number of paths through which the laser beam may be reflected by the corner reflector. In fact, there may be as many as six reflected beams at a given time when the resilient member is vibrated. The six reflected laser beams may be divergent with respect to one another and introduce distortion of the signal produced by the photodetector. Also the light intensity at the photodetector due to the reflected beam is reduced, and the signal-to-noise performance may be poor.

Accordingly, it is an object of the present invention to provide an improved electro-optical modulator.

It is another object of the present invention to provide an improved light modulator for use in a laser communication system.

It is a further object of the present invention to provide an improved wide angle, linear light beam modulator particularly useful for information transmission of a laser beam.

It is still another object of the present invention to provide an improved light beam modulator which does not deflect the light beam from a given path.

Briefly described, a modulator embodying the invention includes a polarizer and an analyzer having crossed light polarizing axis and a transparent means such as a plate of flint glass, which has the property of being birefringent when strained, interposed between the crossed light polarizer and analyzer. The transparent means is bi-refringent, that is, it has at least two indices of refraction. When the transparent means is strained, the indices of refraction become non-isotropic so that a polarized light beam or a laser beam passing through the polarizer and the transparent means undergoes a retardation and becomes elliptically polarized. The elliptically polarized light beam thus has a component prependicular to the original light beam or laser beam passing through the polarizer and entering the transparent means. The perpendicular component of the light beam may thus pass through the analyzer.

A transducer is coupled to the transparent means for inducing a standing wave in the transparent means at its resonant frequency so as to vibrationally strain the transparent means. A light beam, such as a laser beam, passing through the polarizer, transparent means and analyzer may be thus modulated at the resonant frequency, and little additional power is required to strain the transparent means at additional signal frequencies. The transducer is operated by a signal including a modulated carrier substantially equal to the resonant frequency of the transparent means. The transparent means modulates the beam at signal frequencies above or below its resonant frequency in response to the signal. Relatively low signal power is required to modulate the beam at the desired signal frequencies because of the use of the standing wave effect.

Figures 2, 3, 4:
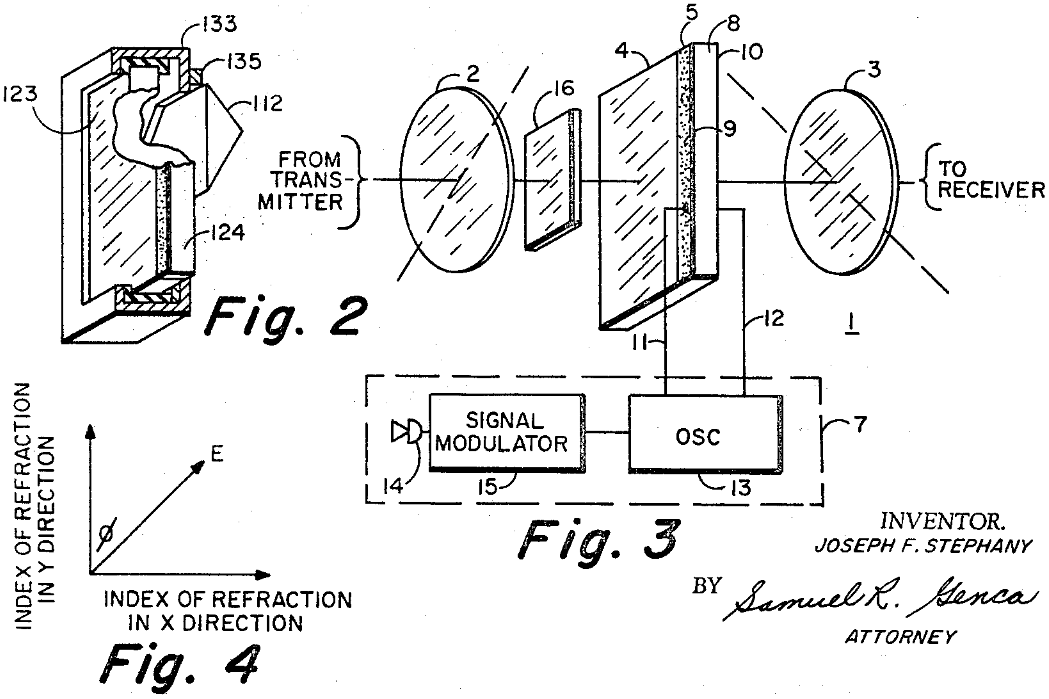

The invention itself, both as to its organization and method of operation, as well as additional objects and advantages thereof, will become more readily apparent from a reading of the following description in connection with the accompanying drawings in which:

FIGURE 1 is a partially schematic and fragmentary view of a laser communications system in accordance with the invention, FIGURE 2 is a perspective, cross-sectional view of a part of a laser modulator used in the communication system of FIGURE 1, FIGURE 3 is a diagrammatic view of a laser modulator in accordance with the present invention, and FIGURE 4 is a curve, showing the relationship of the indices of refraction of a birefringent glass plate in the X and Y direction, useful in explaining the operation of the laser modulator.

Referring first to FIGURE 3, a modulator 1 comprises a pair of crossed light polarizers 2 and 3, a birefringent transparent member 4, sandwiched between the pair of crossed polarizers 2 and 3, an electric-sonic transducer 5, coupled to one end 6 of the transparent member 4 and an electrical circuit 7 connected to the transducer 5 for applying a signal having a carrier frequency which is modulated by an audio signal simultaneously to the transducer 5.

The pair of crossed light polarizers 2 and 3 have polarizing directions or axes which are at right angles to each other so that a laser beam transmitted therethrough may be effectively cancelled, and the intensity of the transmitted beam from the modulator may be practically at zero intensity. The pair of crossed light polarizers 2 and 3 are well known to those skilled in the art and are sometimes referred to as a polarizer and an analyzer, viz. 2 being the polarizer and 3 being the analyzer. The modulator 1 may be light-biased, that is the intensity of the transmitted laser beam emitting from the modulator 1 may be at a level greater than zero by interposing a quarter wave ($\lambda/4$) retardation plate 16 between the member 4 and one of the pair of crossed light polarizers 2 and 3.

The birefringent member 4 is preferably formed of a rectangular plate of flint glass, however, other birefringent materials, such as quartz, transparent Bakelite, glass and the like may be used in the practice of the invention. The member 4 has a natural or resonant frequency when vibrated and may be vibrated in a flexural or extensional mode when stressed in a vibrational mode by the transducer 5. By establishing a standing wave in member 4, a much greater strain can be obtained than if a frequency of vibration not at the resonant frequency was used. The increase in strain caused by using the resonant frequency and, consequently, establishing a standing wave in the birefringent member 4 over the strain observed at a frequency far removed from resonance is related to the mechanical Q of a system which includes transducer 5 and birefringent member 4.

The member 4 has two indices of refraction, one in the Y direction and one in the X direction, as shown in FIGURE 4. The indices of refraction in the X and Y direction vary in response to strain induced in the member 4. In FIGURE 4, for example, a laser beam, having a vector E, is shown resolved along the two indices of refraction in the X and Y direction. In the Y direction, the index of refraction can be expressed as $E \sin \phi$, where $\phi$ is the angle between the polarizing directions of the polarizers 2 and 3. The index of refraction in the direction of the laser beam may be expressed as $E \cos \phi$. The polarized light along the index of refraction parallel to the polarizing direction will be transmitted while the light beam along the index of refraction at right angles to it will be absorbed by the pair of polarizers 2 and 3. Thus, by varying the index of refraction parallel to the polarizing direction, the intensity of the transmitted laser beam will be varied in a proportional amount and thus modulated, as will be explained hereinafter.

The transducer 5 is preferably a piezoelectric device having a piezoelectric element 8, having suitable electrodes 9 and 10 for the application of an applied electrical signal thereto. The transducer 5 is coupled to the member 4 by a suitable cement such as one of the well-known epoxy cements so that when the piezoelectric member 8 vibrates in response to an applied signal to the electrodes 9 and 10, a stress is introduced into the transparent member 4, proportional to the applied signal. Thus the member 4 may be vibrated and stressed in synchronism with the piezoelectric member 8. The piezoelectric member 8 vibrates principally in a thickness mode, that is, it expands and contracts principally along two faces normal to the electrodes 9 and 10, one of which is coupled to the one end 6 of the transparent member 4. It should be understood that other transducers, such as a magnetostrictive transducer may be used to stress the transparent member 4 at various frequencies without departing from the invention.

The electrical circuit 7 includes an oscillator 13, connected to the electrodes 9 and 10 of the transducer 5 by lead wires 11 and 12 respectively. The oscillator 13 supplies an alternating current carrier signal voltage having the same frequency as the resonant frequency of the member 4 so as to vibrate the resonant member 4 at its resonant frequency during its operation to establish a standing wave in the member 4. The oscillator 13 may include means not shown for deriving various frequencies which may be matched to the resonant frequency of the member 4. Thus if the resonant frequency of the member 4 varies from the designed resonant frequency, the output frequency of the oscillator 13 may be adjusted to match the actual resonant frequency of the member 4.

The electrical circuit 7 also includes a microphone 14 and signal modulator 15 connected to the oscillator 13 for converting voice signals to an audio signal voltage which may be used to modulate the output of the oscillator 13. The output of the oscillator 13 is a carrier or sinusoidal voltage; frequency, amplitude, or phase modulated with the audio voice signal which was derived from the output of the microphone 14 and signal modulator 15. Since a standing wave is established in the member 4 at its resonant frequency, relatively little power is required to vibrate and stress the member 4 in response to an audio signal from the signal modulator 15.

In the operation of the modulator 1, considering first the absence of a signal on lead wires 11 and 12 and the omission of the quarter wave plate, a transmitted laser beam will be polarized by the polarizers 2 and 3 so that the intensity of the transmitted laser beam will be practically zero. As was mentioned previously, the modulator 1 may be light biased by interposing the quarter wave retardation plate 16 between the member 4 and one of the pair of polarizers 2 and 3 so that the intensity of the transmitted laser beam will be at a level greater than zero. The efficiency of the modulator 1 at the carrier frequency is, of course, increased by the use of the quarter wave retardation plate 16, whereas in the absence of the quarter wave plate 16 the laser beam may not be modulated below the zero intensity level.

The modulator 1 may be operated in a steady state condition, that is, the output of the modulator 1 may be a laser beam which is modulated at one given frequency, preferably at the resonant frequency of the member 4. This may be accomplished by adjusting the output frequency of the oscillator 13 to the resonant frequency of the member 4. In response to the output voltage of the oscillator 13, the transducer 5 stresses and vibrates the member 4 at its resonant frequency. In response to this vibrational stress, a strain occurs in the member 4 and causes the indices of refraction to become non-isotropic. In other words, the member 4 becomes birefringent so that the plane polarized laser beam passing through the member 4 suffers a retardation, becomes elliptically polarized, and thus has a component perpendicular to the entering laser beam, and as a consequence passes through the analyzer 3. Since the strain is vibratory in nature, the laser beam or light beam may be modulated at or near the resonant frequency of the output frequency of the oscillator 13.

The output frequency of the oscillator 13 may be considered a carrier for other signals such as an audio signal from the signal modulator 15. The advantage of utilizing a carrier frequency at which the member 4 is vibrated, is that a standing wave is established in the member 4, and relatively little power is required to vibrate the member 4 at different frequencies that are near the carrier frequency.

A voice signal applied to the microphone 14 is modulated by the signal modulator 15 and applied to the oscillator 13 and the combined frequencies, namely the audio and carrier frequency, are applied to the transducer 5 over lead wires 11 and 12. The member 4 vibrates in response to the combined signals of the audio frequencies and the carrier frequency. The strain induced in member 4 thus causes the light beam or laser beam to be modulated at these combined frequencies by varying the intensity of the light beam or laser beam at the output of the modulator 1. The laser beam may be amplitude modulated or frequency modulated such as AM, FM, single sideband or the like. It can thus be seen that the modulator 1 has the advantage that a single light beam or laser beam is modulated, and that the output of the modulator 1 is always a single beam so that there is relatively no distortion of the signal, which was a problem in the prior art as heretofore mentioned.

Referring now to FIGURE 1, another embodiment of the invention is shown in use in an optical communication system 100. Portions of the system are described in a United States patent application, Ser. No. 499,516, entitled, "Optical Communication System," filed on Oct. 21, 1965, in the name of Joseph F. Stephany. Specifically, a transmitting station 99, includes a transmitter 101 and a tracking system. A laser beam is transmitted by the transmitter 101 and reflected by transponder 102. The tracking system aligns the laser beam from the transmitter 101 with the transponder 102. The transponder 102 may be spaced from a few feet to hundreds of miles from the transmitting station 99. Once the reflected laser beam is received by the transmitting station 99, the tracking system maintains the proper alignment between the transmitter 101 and the transponder 102 for the transfer of information by the laser beam.

The present invention provides an improved modulator for modulating the laser beam so that each transponder receiving or reflecting the laser beam will have its own signature. That is, each transponder 102 in accordance with this invention includes means for modulating the reflected beam at a given predetermined frequency so that each transponder may be readily identified, as will be shown hereinafter. This, of course, eliminates the possibility that the reflected beam may be reflected by a reflecting object which is not a desired transponder and thus cause unnecessary delay in further searching of the desired transponder 102.

Briefly, the communication system 100 includes a transmitting station 99, including the transmitter 101, having a laser beam source 103, light-coupled to the transponder 102 through a synchronous rotating optical wedge 104, driven by a synchronous clock motor 105 and a tiltable mirror 106 which is under the control of an altitude servo motor 107. The elevation of the laser beam is controlled by the altitude servo motor 107. The azimuth or orientation of the laser beam is under the control of an azimuth servo motor 108, which drives or turns a supporting plate 109 on which the tiltable mirror 106 is mounted. The azimuth servo motor 108 includes a driver member such as a gear 111 coupled to the azimuth plate 109 for turning the plate 109. The laser beam is reflected from the transponder 102 by a retroreflector 112, which reflects the laser beam substantially along the same path from whence it came (transmitting station 99). A fixed mirror 113, fixed to the azimuth plate 109, reflects the reflected laser beam to a photo detector 114 which derives an electrical signal in response to the laser beam.

The continuously rotatable optical wedge 104 deflects the laser beam in a counterclockwise circular path at a rate determined by a two-phase reference signal voltage from a two-phase power supply 115. The locus of points of the center of the continuously deflecting laser beam in the circular path defines a circle through which the laser beam is deflected at a known rate of speed, for example, 60 revolution per second in response to a two-phase, 60 c.p.s. supply voltage. Thus, the rotating optical wedge may rotate at 3600 r.p.m. If the retroreflector 112 appears to be at the center of the circle, the laser beam will be reflected with the equal intensity through its excursion of the circular path and therefore the output of the photo detector 114 at 117 will be a DC electrical output signal voltage $E_S$. However, if the retroreflector 112 is displaced with respect to the center of the circle, the output of the photo detector at 117 will be a sinusoidal signal having a phase angle and amplitude which depends upon the displacement of the retroreflector 112 relative to the center of the circle.

The signal voltage $E_S$ may be compared with the two-phase reference voltage $E_1$ and $E_2$ from the two-phase power supply to determine the necessary correction required both in altitude and azimuth to align the retroreflector 112 to the center of the circle. The electrical signal $E_S$ is applied to the altitude servo motor 107 which compares one of the reference signal voltages $E_1$ from the two-phase power supply, and if the two voltages, $E_S$ and $E_1$ are in phase, the servo motor 107 will not rotate or tilt the mirror; however, if an out of phase exists between the voltage $E_S$ and $E_1$, the servo motor 107 will tilt the mirror 106 in a direction to correct the out-of-phase condition. The same action is also true if the signal voltage $E_S$ is out of phase with the other one of the reference signal voltage, namely $E_2$. That is, when the signal voltage $E_S$ and the reference voltage $E_2$ are applied to the azimuth servo motor 108, the servo motor 108 will remain at rest when the signal voltage $E_S$ and reference voltage are in phase, or the signal voltage $E_S$ is a DC signal voltage, and if an out-of-phase condition exists between signal voltage $E_S$ and $E_2$, the azimuth servo motor 108 will rotate the azimuth plate 109 in a direction which corrects the out-of-phase condition.

In accordance with the invention, the laser beam may be modulated about a zero intensity level or at a biased intensity level at the transmitting station 99 or the transponder 102 for the two-way flow of information. FIGURE 1 shows the laser beam modulated at the transponder 102, for purposes of explanation. The laser beam is modulated at the transponder 102 in a modulator similar to the modulator 1 of FIGURE 3. The modulator of FIGURE 1 differs from the modulator 1 of FIGURE 3 in that part of the modulator, namely the pair of polarizers 121 and 122, are disposed at the transmitting station 99, while the remaining portion of the modulator, namely the birefringent transparent plate 123 which is the transducer 124, coupled to the birefringent plate 123, are at the transponder 102. An electrical circuit 125, which includes an oscillator 126, a signal modulator 127 and a microphone 128 are disposed at the transponder 102 for modulating the laser beam so that information may be sent from the transponder 102 to the transmitting station 99. For receiving the information, a tuned amplifier 129, connected to the photo detector 114 at 117, a signal detector 130 and an audio pick up device, such as a receiver 131 are used at the transmitter for deriving the audio signal. The tuned amplifier 129 may be tuned to the carrier frequency of the modulator which also serves as an identification of the signature of the transponder 102.

One of the features of the modulator shown in FIGURE 1 is that the pair of polarizers 121 and 122 may be disposed on each side of the mirrors 106 and 113 so that the intensity of the laser beam to the transponder 102 is relatively unaffected by the pair of polarizers. Stated in another way, the transponder 102 is optically interposed between the pair of polarizers 121 and 122. That is, the intensity of the laser beam from the transmitter 101 to the transponder 102 is polarized, but the intensity of the laser beam at the transponder is relatively unaffected by this polarization. The reflected beam from the retroreflector 112 to the mirror 111 is also at the same intensity so that the transmission of the laser beam between the transmitter and transponder is carried on at the maximum intensity of the system. A quarter wave plate 132 is interposed between the mirror 103 and the polarizer 122 to bias the modulator so that a portion of the laser beam is always reflected back to the photo detector 114.

The birefringent plate 123 and transducer 124 are mounted in a frame 133 which includes a vibration insulating material 134 such as cellular rubber or foam plastic for isolating and permitting the birefringent plate 123 to be vibrated at its resonant frequency and other signal frequencies. The retroreflector 112 may be mounted on the frame 133 by a supporting clamp 135, as shown in FIGURE 2. FIGURE 2 shows in greater detail the assembly of the frame 133, the birefringent transparent plate 123 and the transducer 124. The retroreflector 112 includes three reflecting surfaces which are rigid and are normal to each other. The birefringent plate 123 has a resonant frequency and vibrates in the same manner explained for the birefringent member 4 of the modulator 1. The birefringent plate 123 is spaced from the retroreflector 112 so that the laser beam is transmitted substantially along one given path from whence it came. The given path comprises an incident path from the transmitting station 99 to the transponder and a reflecting path from the transponder 102 to the transmitting station 99.

In the operation of the modulator of FIGURE 1, the laser beam is transmitted through the polarizer 121 through the rotating optical wedge 104 and reflected by the mirror 106 through the birefringent plate 123 to the retroreflector 112. The laser beam is reflected by the retroreflector 112 to the mirror 113 where it is reflected again substantially at 90° through a quarter wave plate 132 through the crossed light polarizer or analyzer 122 to the photo detector 114. In the absence of any signal from the electrical circuit 125, the laser beam is not modulated, and a DC signal is derived by the photo detector in response to the reflected laser beam when the transmitter is aligned with the transponder as previously described.

When the oscillator 126, coupled to the transducer 124, supplies a carrier signal voltage having a frequency which matches the resonant frequency of the birefringent plate 123, the laser beam is modulated at the resonant frequency in a manner previously described. That is, the transducer 124 stresses the birefringent plate 123 and induces a strain in the plate 123 in an amount proportional to the signal from the oscillator 126. The stress introduced by the transducer 124 causes the index of refraction of the plate to become non-isotropic and modulates the beam. In response to the modulated laser beam, the photo detector derives an electrical signal having the same frequency as the laser beam. The output of the photo detector 114 at 117 is applied to a tuned amplifier 129 and signal detector 130, wherein the electrical signal from the photo detector 114 is converted into an audio signal. The audio signal has the same frequency as the signal which modulates the oscillator 126. Thus the audio signal may be referred to as the signature of the particular transponder 102.

Voice signals or other signals may be superimposed on the laser beam through the microphone 128 to the signal modulator 127 which superimposes the audio signal on the output of the oscillator 126 so that the oscillator 126 has an output which includes a signal at the resonant frequency of the plate 123 which acts as a carrier frequency which is modulated by the audio signal. The modulated signal is applied to the transducer 124 which stresses the birefractive plate and causes it to vibrate at the modulated signal. A standing wave is established by the transducer 124 which is driven by the output of the oscillator 126. Little additional power is required to vibrate the plate 123 over the audio signal sidebands on each side of the carrier frequency. As was mentioned previously, the plate 123 is stressed by the transducer 124 and induces a strain which changes the indices of refraction of the plate 123 and causes the laser beam to be modulated in accordance with the invention.

While various embodiments of the invention have been described, variations thereof and modifications therein within the spirit of the invention will undoubtedly suggest themselves to those skilled in the art. Accordingly, the foregoing descriptions should be taken as illustrative and not in any limiting sense.

What is claimed is:

1. A system for communication between a transmitting station and a transponder station via an optical beam, said system comprising (a) reflecting means at said transponder station for receiving said beam along an incident path and reflecting said beam along a reflecting path, (b) a pair of crossed light polarizers at said transmitting station, one in said incident path and the other in said reflecting path so that the intensity of said beam transmitted through said polarizer in said reflecting path is substantially at zero intensity, (c) a birefringent transparent member at said transponder station and in said reflecting path, (d) electrical signal operated transducer means coupled to said transparent means for stressing said transparent means at a certain vibrational frequency, and (e) means at said transmitting station for aiming said beam responsive to said reflected beam when said beam is modulated at said certain frequency.

2. The invention defined in claim 1, further including a quarter wave plate in said reflecting path.

3. The invention as set forth in claim 1 including a housing having sides and being open at its front and rear opposite ends, said front and rear opposite ends being transversed by said incident and reflecting paths, said bi-refringment member being mounted in said housing and extending across said sides thereof, and wherein said reflecting means is a corner cube retroreflector attached to said housing and disposed with its open end across said rear end.

References Cited

UNITED STATES PATENTS

| | | | |
|---|---|---|---|
| 2,622,470 | 12/1952 | Rines | 350—149 X |
| 2,623,165 | 12/1952 | Mueller et al. | 250—199 |
| 2,707,749 | 5/1955 | Mueller | 250—199 |
| 2,982,859 | 5/1961 | Steinbrecher. | |

ROBERT L. GRIFFIN, *Primary Examiner.*

JOHN W. CALDWELL, *Examiner.*

B. V. SAFOUREK, *Assistant Examiner.*